(12) United States Patent
Bar-on

(10) Patent No.: US 10,698,748 B1
(45) Date of Patent: Jun. 30, 2020

(54) ISSUE TRACKING SYSTEM HAVING TEMPORARY NOTIFICATION SUPPRESSION CORRESPONDING TO GROUP ACTIVITY

(71) Applicants: Atlassian Pty Ltd., Sydney (AU); Atlassian Inc., San Francisco, CA (US)

(72) Inventor: Noam Bar-on, San Francisco, CA (US)

(73) Assignees: ATLASSIAN PTY LTD., Sydney (AU); ATLASSIAN INC., San Francisco, CA (US)

( * ) Notice: Subject to any disclaimer, the term of this patent is extended or adjusted under 35 U.S.C. 154(b) by 0 days.

(21) Appl. No.: 16/406,940

(22) Filed: May 8, 2019

(51) Int. Cl.
*G06F 9/54* (2006.01)
*H04L 29/06* (2006.01)
*H04L 12/18* (2006.01)

(52) U.S. Cl.
CPC .............. *G06F 9/542* (2013.01); *G06F 9/546* (2013.01); *H04L 12/1831* (2013.01); *H04L 12/1895* (2013.01); *H04L 65/1083* (2013.01); *H04L 65/403* (2013.01)

(58) Field of Classification Search
None
See application file for complete search history.

(56) References Cited

U.S. PATENT DOCUMENTS

| 8,825,798 | B1 * | 9/2014 | Johnson | G06Q 20/385 709/217 |
|---|---|---|---|---|
| 2014/0022328 | A1 * | 1/2014 | Gechter | G06Q 30/06 348/14.02 |
| 2020/0042368 | A1 * | 2/2020 | Gupta | G06F 3/0631 |

\* cited by examiner

Primary Examiner — Craig C Dorais
(74) Attorney, Agent, or Firm — Brownstein Hyatt Farber Schreck, LLP

(57) ABSTRACT

An issue tracking system configured to track issues, tickets, or tasks is described herein. The issue tracking system may be used to create, modify, and delete issue records during a live meeting or event. The issue tracking system may be adapted to determine a likelihood of user attendance or user proximity and, in accordance with the likelihood exceeding a threshold or meeting a criteria, suppress transmission of notifications to a subset of user devices. Normal or unsuppressed notification transmission is maintained to another subset of user devices.

20 Claims, 7 Drawing Sheets

ISSUE TRACKING SYSTEM HAVING TEMPORARY NOTIFICATION SUPPRESSION CORRESPONDING TO GROUP ACTIVITY

TECHNICAL FIELD

Embodiments described herein relate to issue tracking systems and, in particular, to systems and methods for suppressing notifications generated by an issue tracking system.

BACKGROUND

An organization or individual can leverage an issue tracking system to document and monitor completion of work related to a project or goal. In some use cases, various issues or items being tracked by an issue tracking system are updated in a meeting attended by several of the team members that are associated with the issues being updated. Each update or change may generate a notification that is sent to members of the team, which may be unnecessary or distracting to team members that are physically present during the meeting. The systems and methods described herein are directed to techniques that may be used to temporarily or momentarily suppress notifications to selected individuals that may be attending the relevant meeting in person.

SUMMARY

Embodiments described herein are directed to an issue tracking system that is configured to track issues, tickets, or tasks. The issue tracking system may be used to create, modify, and delete issue records during a live meeting or event. As described herein, various interactions with the issue tracking system may result in a series of notifications that are transmitted to a group of users associated with the relevant issue or project. However, if the interactions occur during a live meeting, attendees of the live meeting may not need an electronic notification since they are aware of the activity occurring during the meeting. The systems and techniques described herein are directed to temporarily muting or suppressing a transmission of notifications for a particular set of users. In particular, the issue tracking system may be adapted to determine a likelihood of user attendance or user proximity and, in accordance with the likelihood exceeding a threshold or meeting a criteria, suppress transmission of notifications to a subset of user devices. Normal or unsuppressed notification transmission may be maintained to another subset of user devices.

Some example embodiments are directed to an issue tracking system for editing and tracking issue records. The issue tracking system may include a primary client device that is configured to display a graphical user interface of a primary issue tracking client application. The primary issue tracking client application may be configured to generate new issue requests and edit existing issue records during a live meeting. The issue tracking system may also include a set of secondary client devices, each secondary client device configured to display a graphical user interface of a secondary issue tracking client application. The issue tracking system may also include a host service that is operably coupled to the primary client device and the set of secondary client devices over a network. The host service may be configured to: generate a new issue record in response to receiving a new issue request from the primary client device; modify an existing issue record in response to receiving an edit request from the primary client device; and generate a notification for one or more of a creation of a new issue record or a modification of the existing issue record. The host service may also be configured to determine a likelihood that one or more secondary client devices of the set of secondary client devices are associated with one or more users attending the live meeting. The host service may identify a first subset of client devices of the set of secondary client devices for which the likelihood exceeds an attendance threshold and identify a second subset of client devices of the set of secondary client devices for which the likelihood does not exceed the attendance threshold. The host service may transmit the notification to the second subset of client devices and suppress a transmission of the notification to the first subset of client devices.

In some example embodiments, the host service is configured to estimate a duration of the live meeting. The transmission of the notification may be suppressed for the first subset of client devices for a first duration, which is determined based, at least in part, on the estimated duration of the live meeting. The host service may be configured to generate a first notification in response to a new issue record being created and the host service may transmit the first notification to the first subset of client devices after the first duration has lapsed. The host service may also generate a second notification in response to a modification of an existing issue record. The host service may transmit the second notification to the second subset of client devices, which may not be transmitted to the first subset of client devices.

Some embodiments are directed to an issue tracking system in which determining the likelihood that one or more secondary client devices are associated with one or more users attending the live meeting comprises: establishing a wireless communication link between the primary client device and a respective secondary client device of the one or more secondary client devices; and estimating a proximity between the respective secondary client device and the primary client device based, at least in part, on the wireless communication link. In some cases, the estimated proximity includes a determination that the secondary client device and the primary client device are in a common room.

In some embodiments, determining the likelihood that one or more secondary client devices are associated with one or more users attending the live meeting comprises receiving an acceptance of a calendar invite from a respective secondary user device of the one or more secondary user devices. In some embodiments, determining the likelihood that one or more secondary client devices are associated with one or more users attending the live meeting comprises receiving an e-mail reply from a secondary user device of the one or more secondary user devices and determining the likelihood is based, at least in part, on subject text extracted from the e-mail reply.

In some cases, the host service is configured to reassign a respective secondary client device from the second subset of client devices to the first subset of client devices in response to a user input to the secondary issue tracking client application on the respective secondary client device.

In some embodiments, the first and second subsets of client devices are associated with respective users that are named in the new issue request or that are named in the existing issue record. The host service may be configured to not transmit the notification to users that are not named in either the new issue request or the existing issue record.

In some instances, the host service is configured to determine an estimated duration of the live meeting. The host service may be configured to suppress a transmission of a series of notifications that are generated before the estimated duration has lapsed. The host service may also be configured to transmit the series of notifications to the first subset of client devices after the estimated duration has lapsed.

Some example embodiments are directed to an issue tracking system for updating a set of issue records of a project during a live meeting. The issue tracking system may include a primary user device displaying a graphical user interface during a live meeting and a set of user devices, each user device associated with a user named in one or more issue records of the set of issue records. The issue tracking system may also include a host service operably coupled to the primary user device and the set of user devices by a network, the host service configured to: receive an action request from the primary user device, the action request associated with one or more records of the set of issue records; modify or create an issue record in response to receiving the action request; generate a notification corresponding to the action request; determine a likelihood that a first subset of user devices of the set of user devices is proximate to the primary user device when the action request was generated by the primary user device; suppress a transmission of the notification to the first subset of user devices; and transmit the notification to a second subset of user devices of the set of user devices. In some cases, the likelihood is determined based, at least in part, on an acceptance of a meeting request from a respective client device of the set of user devices.

The issue tracking system may be configured to determine a proximity estimate for one or more user devices of the set of user devices. The likelihood may be determined based, at least in part, on the proximity estimate satisfying a proximity threshold. The issue tracking system may be configured to determine the proximity estimate using a wireless signal received by the primary user device from the one or more user devices. In some cases, the wireless signal is a wireless beacon signal that includes a unique identifier and a transmission power reference. The likelihood may be determined based, at least in part, on the transmission power reference and a received signal power of the wireless signal.

In some implementations, the set of user devices is each configured to execute an issue tracking client application that is configured to display received private message notifications. The host service may be configured to transmit an e-mail notification and a private message notification to the second subset of client devices in response to the generation of the notification. The host service may also be configured to transmit the private message notification to the first subset of client devices in response to the generation of the notification, in response to the generation of the notification and a determination that the live meeting has lapsed. The host service does not transmit the e-mail notification to the first subset of client devices.

Some example embodiments are directed to a computer-implemented method for updating a set of issue records of a project during a live meeting. The method may include: displaying a graphical user interface using a primary user device during a live meeting; receiving an action request from the primary user device during the live meeting, the action request associated with one or more records of the set of issue records; modifying or creating an issue record in response to receiving the action request; generating a notification corresponding to the action request; determining a likelihood that one or more client devices of the set of client devices are associated with one or more users attending the live meeting; identifying a subset of client devices of the set of client devices for which the likelihood exceeds an attendance threshold; and suppressing a transmission of the notification to the subset of client devices at least until a determination that a duration of the live meeting has lapsed.

In some cases, determining the likelihood that the one or more client devices of the set of client devices are associated with the one or more users attending the live meeting comprises receiving a wireless transmission from the one or more client devices and estimating a proximity of the one or more client devices based on a received power of the wireless transmission.

In some cases, determining the likelihood that the one or more client devices of the set of client devices are associated with the one or more users attending the live meeting comprises receiving a response to a calendar invite from the one or more client devices.

In some embodiments, the notification is one of a group of notifications that are generated during the live meeting, and the group of notifications are transmitted to the subset of client devices after the live meeting has lapsed.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1:
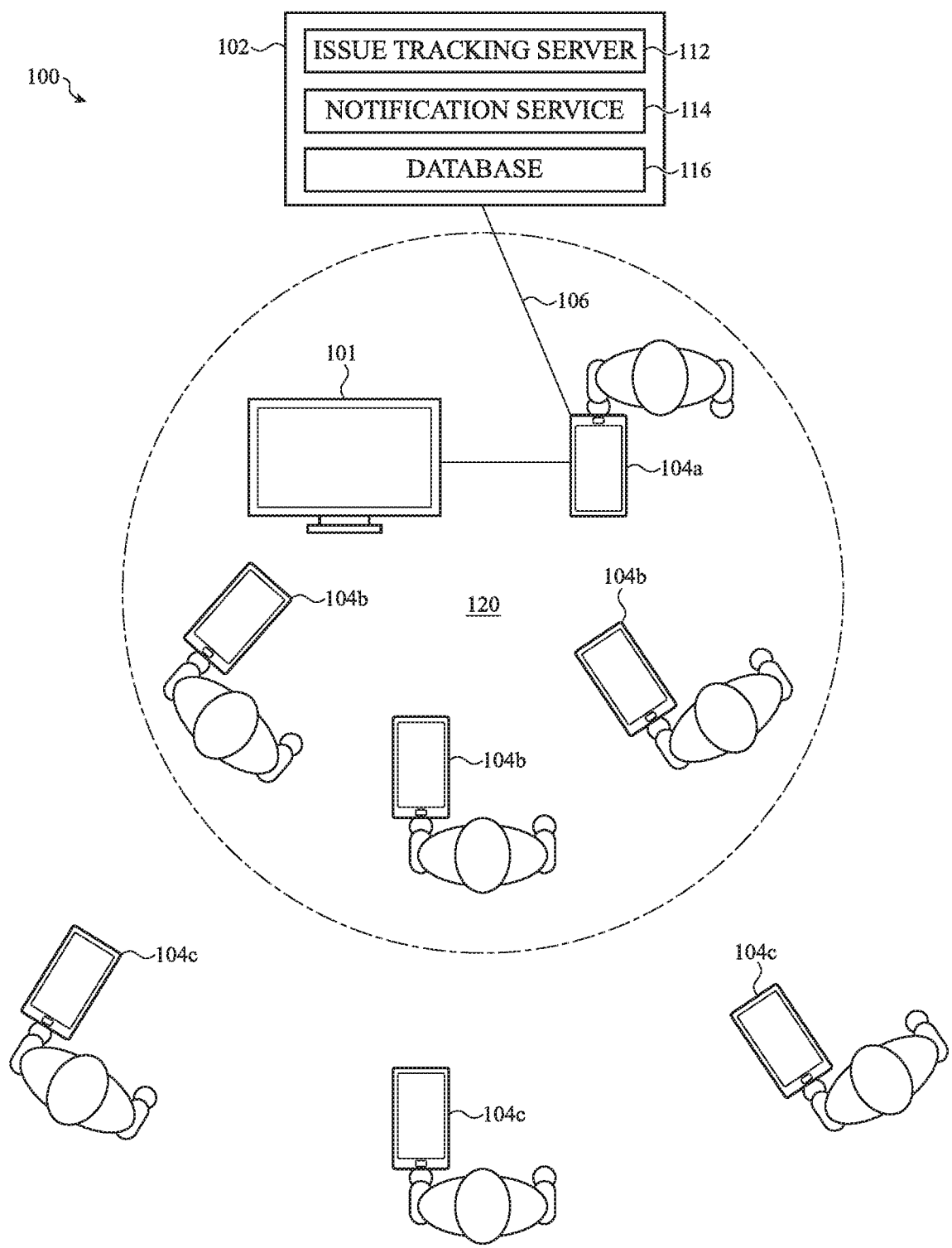
FIG. 1 is a schematic representation of an issue tracking system.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein are directed to systems and methods for an issue tracking system that is adapted to send smart notifications to a group of client devices or user devices that are in communication with a host service or system. As described herein, an issue tracking system may be specially configured to track various issues or tickets that are assigned to persons on a project or team. The issues or tickets may be updated on a regular basis as progress is made on various tasks or events that are associated with the issues or tickets. In response to a ticket being updated or created, the host service may generate an (electronic) notification that is transmitted to a group of users that are associated with the ticket or project. This allows the team to stay current on changing developments and also generates a record or log of notifications for later reference. In some implementations, an efficient method of updating a group of tickets that are associated with a project is to conduct a regular (e.g., daily) meeting in which the team members attend (either physically or virtually) to communicate their status and keep the respective issues or tickets current and up to date. However, because members of the team that are attending a live meeting are viewing the changes as they are made, it may not be necessary that the attendees receive notifications from the host service in real time. In fact, it may not be necessary that members of the team receive some of the notifications at all.

The embodiments described herein are directed to an issue tracking system in which a host service, or a notification service of a host service, is adapted to suppress a subset of notifications based on a predicted attendance of the respective user. As described herein, the host service may determine a likelihood that a user is attending or not attending a live meeting and, in response to the likelihood exceeding a threshold, suppress one or more notifications from being transmitted to users that may be attending the live meeting (whether virtually or physically attending). As described herein, the likelihood may be based on a wireless communication with one or more client devices (also referred to herein as "user devices") associated with a respective user or meeting attendee. In some implementations, the likelihood may be based on user activity associated with a calendar event or invite. For example, the likelihood of attendance may be increased in response to a user accepting a meeting invite or responding to another form of electronic invitation. In some implementations, the user may also expressly opt in or opt out of a momentary or temporary notification suppression scheme.

An issue tracking system, as described herein, may be used to refer to a project management tool that may be specially configured for tracking issues and tasks that are associated with a software development project. As described herein, an issue tracking system may be used to refer to a project management tool that can be implemented in whole or in part as software executed by a virtual or physical server or other computing appliance that provides a team of individuals with a means for documenting, tracking, and monitoring completion of work as discrete tasks related to completion, development, or maintenance of a defined project or goal. In many examples, an issue tracking system is configured for use by a software development team to track completion and assignment of discrete tasks related to software development projects from creation of new user stories (i.e., user-perspective feature requests or desired functionality), through proof of concept testing, through integration testing, through release of software to one or more users, and through reporting and fixing of software errors ("bugs"). In other cases, an issue tracking system can be configured for non-software tracking purposes, such as for use by a human resources team, an information technology support group, and so on.

An issue tracking system, as described herein, may increase the efficiency of a team of individuals working on a common goal or project by facilitating the organization of the assignment of discrete items of work to the individual or team of individuals most suited to perform that work. More particularly, each item of work tracked by an issue tracking system is referred to as an "issue" that is typically assigned to a single individual to complete. Example "issues" can relate to, without limitation: a task to identify the cause of a software bug; a task to perform a feasibility assessment for implementation of a new feature; a task to fix an identified software bug; and so on.

For purposes of the following disclosure, the terms "issue report," "issue," and "ticket" may be used to generally refer to an issue or item that is being tracked by the system. More specifically, the term "issue request" is generally used to describe input provided by a user to an issue tracking system that may result in a creation of an "issue record." As used herein, the term "issue record" may be used to refer to a discrete database record associated with an issue or item being tracked by an issue tracking system. Although not required, an issue record can be stored, at least temporarily, in a database accessible to an issue tracking system. While these terms are used herein with respect to specific examples and potential implementations, it may be appreciated that these are merely examples and other embodiments can be configured to receive, anticipate, predict, and/or recommend additional or alternative data, user inputs, or issue requests or issue records associated with an issue tracking system.

These foregoing and other embodiments are discussed below with reference to FIGS. 1-7. However, those skilled in the art will readily appreciate that the detailed description given herein with respect to these figures is for explanatory purposes only and should not be construed as limiting.

FIG. 1 depicts a schematic diagram of an example implementation of an issue tracking system 100. In particular, FIG. 1 depicts an issue tracking system 100 in which a primary client device 104a is used to broadcast and/or control meeting content using a client application being executed on the primary client device 104a. In the simplified example provided in FIG. 1, the meeting content may include a graphical user interface generated by an issue tracking client application and that is displayed on display 101. The display 101 may be a display of the primary client device 104a and/or may be a separate display that is projected or enlarged to be more easily viewed by other participants of the meeting. Aspects of the graphical interface may also be broadcast to remote display devices by a web-enabled meeting, networked conference meeting, or other conferencing tool used to share content across multiple geographic locations. In one example, the graphical user interface being displayed on the display 101 may depict a list of items that corresponds to a set of issue records that is being tracked by the host service 102 of the issue tracking system 100.

In the depicted example, the set of issue records may correspond to tasks or issues that are being handled by team or project. During a live meeting, the primary client device 104a may be used to request an edit to one or more of the set of issue records. The request may be generated in response to user input received from a graphical user interface generated by an issue tracking client application that is running or being executed on the primary client device 104a. The request to edit an issue record may be transmitted, via a network connection using network 106, to a host service 102. In some cases, as described herein, the primary client device 104*a* may also transmit an issue request (e.g., request the creation of a new issue record) to the host service 102. The various requests that are transmitted to the host service 102 during the course of a live meeting may result in the editing and/or creation of one or more issue records by the host service 102. In response to the editing and/or creation of an issue record, the host service 102 may include a notification service 114, which may generate one or more notifications that are transmitted to the various client devices 104*b*, 104*c* that are associated with the issue record, project, and/or team. The notifications may be transmitted as an e-mail notification, personal message, notification alert, or other form of electronic communication.

The notifications generated by the notification service 114 of host service 102 serve to communicate the changes being incurred as a result of activity during the live meeting. The notification may also serve as a record of actions taken and may be viewed in a notification log or other activity summary. However, in some instances, the notifications include information that is redundant to those users that are physically attending or otherwise viewing the content displayed during the live meeting. The issue tracking system 100, as described herein, may be used to suppress the transmission of some or all of the notifications generated during a live meeting to reduce the number of overall notifications received by users attending the meeting and to keep users focused on the content being presented during the meeting. In some cases, the issue tracking system 100 may be used to suppress certain types of notifications to a subset of users, while blocking or canceling the transmission of other types of notifications.

The issue tracking system 100, as described herein, is configured to determine a likelihood that a subset of client devices is associated with users that are attending the live meeting (whether physically attending or virtually attending by a video conference or other broadcast). In some cases, the issue tracking system 100 is adapted to determine a likelihood that one or more client devices 104*b*, 104*c* are proximate to the primary client device 104*a*. For those client devices (e.g., client devices 104*b*) for which the likelihood exceeds a threshold, one or more notifications may be suppressed. For those client devices (e.g., client devices 104*c*) for which the likelihood does not exceed a threshold, the notifications generated and transmitted by the host service 102 may not be suppressed. For purposes of the following discussion, suppression of a notification may include canceling a transmission of a notification, delaying a transmission of a notification, accruing the notification in a notification summary or log, or otherwise affecting the normal transmission of a notification or series of notifications.

As shown in FIG. 1, the issue tracking system 100 may identify a first subset of secondary client devices 104*b* that each have a likelihood of attendance that exceeds a given threshold. For purposes of illustration, each of the secondary client devices 104*b* of the first subset of client devices 104*b* is depicted as being proximate to the primary client device 104*a*. Specifically, the first subset of client devices 104*b* is estimated to be within a geographic region 120, which may correspond to a conference room or a physical proximity to the display 101 and the primary client device 104*a*. However, depending on the implementation, one or more of the secondary client devices 104*b* may be located remote with respect to the primary client device 104*a* and may be attending the live meeting via a video conference, shared display, or other remote conferencing tool. In accordance with a determination that one or more of the secondary client devices satisfy a likelihood of attendance and/or a threshold proximity, the host service 102 may suppress the transmission of one or more notifications that are generated as a result of activity during the live meeting.

As also shown in FIG. 1, the issue tracking system 100 may also identify a second subset of client devices (e.g., client devices 104*c*), each of which has a likelihood of attendance or proximity that does not satisfy a given attendance threshold. For each of the secondary client devices 104*c*, the notification service 114 of the host service 102 may generate and transmit notifications in a normal fashion. More specifically, the notification service 114 of the host service 102 may generate and transmit notifications that result from activity that occurs during the live meeting without suppressing (e.g., canceling or delaying) notifications to the secondary client devices 104*c*.

In some cases, the issue tracking system 100 is further configured to determine an estimated meeting duration or otherwise estimate a duration or time window associated with the live meeting. The issue tracking system 100 may also be configured to identify a series or group of notifications that are generated during the estimated meeting duration. In accordance with embodiments described herein, the issue tracking system 100 may be configured to suppress the identified series of notifications to a first subset of client devices 104*b* while allowing un-suppressed or normal transmission of the series of notifications to a second subset of client devices 104*c*. In some implementations, the series of identified notifications are transmitted to the first subset of client devices 104*b* in accordance with a determination that the estimated meeting duration has lapsed and/or the time window associated with the live meeting has passed.

FIG. 1 is a schematic representation of an issue tracking system 100 having a networked or cloud-based architecture. In the illustrated embodiment, the issue tracking system 100 is implemented with a client-server architecture including a host service 102 that communicably couples (e.g., via a network 106 that includes one or more networking or wired or wireless communication protocols) to one or more client devices 104*a*, 104*b*, 104*c*. As shown in FIG. 1, the host service 102 is operably or communicatively coupled via a network 106 to a client device 104*a*, which may also be referred to herein as a primary client device 104*a*. Also, as shown in FIG. 1, the host service 102 is also operably or communicably coupled via a network 106 to a set of client devices 104*b*, 104*c*, which may be referred to herein as secondary client devices 104*b*, 104*c*. It may be appreciated that other client devices may be configured in a substantially similar manner as the client devices 104*a*, 104*b*, 104*c*, although this may not be required of all embodiments and different client devices can be configured differently and/or may transact data or information with, and/or provide input (s) to, the host service 102 in a unique or device-specific manner.

The client devices 104*a*, 104*b*, 104*c* can be any suitable personal or commercial electronic device and may include, without limitation or express requirement, a processor or processing unit, volatile or non-volatile memory (identified, collectively, as the memory), and a display. Example electronic devices include, but are not limited to: laptop computers; desktop computers; cellular or mobile phones; tablet computing devices; and so on. It may be appreciated that client devices 104*a*, 104*b*, 104*c*, such as described herein, can be implemented in any suitable manner. An example client device is described below with respect to FIG. 7.

In many embodiments, the processor of the client devices 104a, 104b, 104c, can be configured to execute an application (herein referred to as a "client application" or an "issue tracking client application") that is executed or run using the processor or processing unit of the client device and may be stored, at least in part, in the memory. The client application may include a graphical user interface that is configured to display one or more notifications that are generated by the host service 102. The client application may also be configured to produce a graphical user interface having a set of fields or other template for receiving user input regarding an issue request or ticket. The client application is configured to access and communicate with the host service 102 and to securely transact information or data with, and provide input(s) to, the host service 102. In some embodiments, the client application may be a browser application configured to access a web page or service hosted by the host service 102 that is accessible to the client devices 104a, 104b, 104c over a private or public network that may, in some embodiments, include the open internet. The client application may be configured to display the graphical user interface through the browser and/or a dedicated issue tracking software application. In some cases, the graphical user interface is adapted to the display of the client device and may be presented in a mobile format or full format depending on the size and/or resolution of the client device display.

In many embodiments, the host service 102 is configured to operate within or as a virtual computing environment that is supported by one or more physical servers including one or more hardware resources such as, but not limited to (or requiring) one or more of: a processor or processing unit; a memory; non-volatile storage; networking connections; and the like. As used herein, a processor of the host service 102 may refer to one or more physical processors or processing units implemented on one or more physical computing systems that, alone or together, can be configured to implement the functionality described herein. The host service 102 may be implemented on a single computing system or using a distributed network of computing systems. For simplicity of description and illustration, the various hardware configurations associated with a processor, computing device, or hardware architecture are not shown in FIG. 1. Hardware aspects of the host service 102 may correspond to the hardware of the client device described below with respect to FIG. 7. In general, the hardware of the host service 102 may be distributed across multiple servers or physical computing devices in order to allow for scalability and remote access from a variety of geographic locations.

In many embodiments, the host service 102 can include a number of discrete subservices or purpose-configured modules, containers, or virtual machines each configured to perform, coordinate, serve, or otherwise provide one or more services, functions, or operations of the host service 102, such as the operations of estimating a likelihood that a subset of client devices are attending a meeting, transmitting a series of notifications associated with the meeting to a first subset of client devices and suppressing the transmission of the series of notifications to a second subset of client devices that is different than the first subset of client devices. In the example of FIG. 1, the host service includes one or more issue tracking server(s) 112, which may be used to track the various tickets, issues, issue records, and other information associated with the issue tracking system 100. The issue tracking server(s) 112 may be operably connected to (or may include) one or more database(s) 116 that are used to store the data and other information used by the issue tracking server(s) 112. The host service 102 may also include a notification service 114 that is adapted to generate and transmit electronic notifications in response to actions performed by or using the issue tracking server(s) 112. Alone or in combination with other hardware elements associated with the host service 102, the issue tracking server(s) 112, the notification service 114, and the one or more database(s) 116 may be configured or adapted to perform any number of other operations, as described herein. Specifically, the host service 102 may be configured to perform one or more of the operations described below with respect to the examples of FIGS. 2-6, as described in more detail below.

Figure 2:
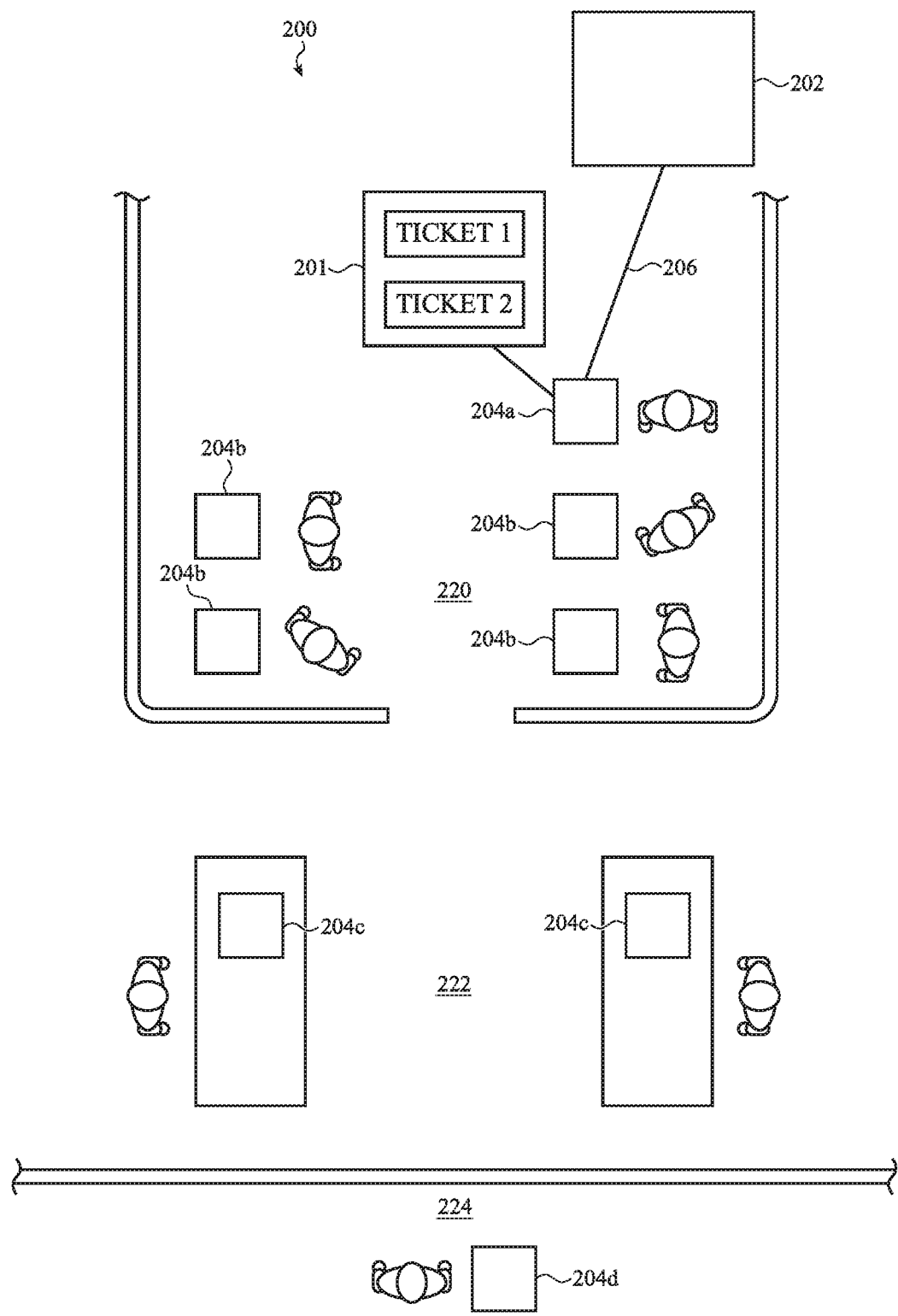
FIG. 2 is an example implementation of an issue tracking system.

FIG. 2 depicts an example issue tracking system 200 that is configured to suppress or otherwise alter the transmission of a series of notifications generated by a host service 202. As shown in FIG. 2, the issue tracking system 200 includes a host service 202 (also referred to herein as a host system) that is operably coupled to a group or set of client devices 204a, 204b, 204c, 204d via a network. Similar to other examples provided herein, the network may include a cellular or wireless network that enables the client device 204a, 204b, 204c, 204d to communicate with the host service 202 through a web interface or other networked interface. In particular, the client devices 204a, 204b, 204c, 204d may each execute an instance of a respective client application (e.g., an issue tracking client application), which may include a web browser, dedicated application program, or other software that is executed and/or stored, at least in part, on each of the respective client devices 204a, 204b, 204c, 204d.

In the present example, the issue tracking system 200 may be configured or adapted to determine which client devices 204a, 204b, 204c, 204d are associated with users that are attending a live meeting, whether the attendance is a physical attendance, or whether the attendance is a virtual attendance that is conducted through a broadcast, teleconference, video conference, or other similar system. The issue tracking system 200 may determine the likelihood based on a proximity of the various client devices and/or user activity including, for example, meeting request responses, calendar entries, device activity, or one of a variety of device inputs. For purposes of the following illustration, the client devices 204a, 204b are depicted as being commonly geographically located in geographic location 220, which may correspond to a conference room or enclosed area. However, the following example may also be extended to include scenarios in which one or more of the client devices 204b are located remote with respect to the other client devices 204a, 204b and are attending the meeting virtually through a broadcast, teleconference, video conference or other similar technique. For example, one or more of the client devices 204c, 204d may be attending the live meeting virtually and may be treated accordingly by the issue tracking system 200 even though one or more of the client devices 204c, 204d are located remote from the other attending client devices 204a, 204b.

In the present example, a primary client device 204a may be used to present a portion or all of the meeting content that is associated with the live meeting. In the present example, the primary client device 204a is coupled to a display 201 used to display a graphical user interface generated by a client application (e.g., an issue tracking client application) running on the primary client device 204a. The primary client device 204a may be associated with or operated by a meeting leader, who may be a project manager or technical lead on a project or team. The primary client device 204a may be executing an issue tracking client application, which may include a dedicated issue tracking client application instance or a web-enabled interface that accesses the host service 202 over the network 206. In the present example, the primary client device 204a may present or cause the display of a graphical user interface that includes a series of issues or tickets that are being handled by the team. In this example, the team includes the users or individuals that are associated with the client devices 204a, 204b, 204c, 204d.

The series of issues or tickets that are being displayed during the meeting may, for example, correspond to a daily or regular Kanban status meeting. In the present example, the display 201 is adapted to display a graphical user interface that allows the primary client device 204a to review and edit various tickets or issues associated with a project or team. The issues or tickets may be edited, created, deleted, or otherwise modified during the meeting and thereby cause the host service 202 to generate one or more notifications, which may be suppressed in accordance with the embodiments described herein. An example of a graphical user interface that may be displayed using the primary client device 204a is described below with respect to FIG. 4.

The primary client device 204a may be used to gather feedback from team members during the live meeting and may serve as the primary interface to the host service 202 of the issue tracking system 200. By way of example, the primary client device 204a may be used to edit various aspects of the tickets or issues being displayed and discussed during the live meeting. The primary client device 204a may also be used to create new issues or tickets as well as close or delete issues or tickets, in accordance with the needs of the team. Additionally or alternatively, any one of the other client devices 204b, 204c, 204d may also be used to edit, add, delete, and/or close various issues or tickets associated with the live meeting.

Figure 3:
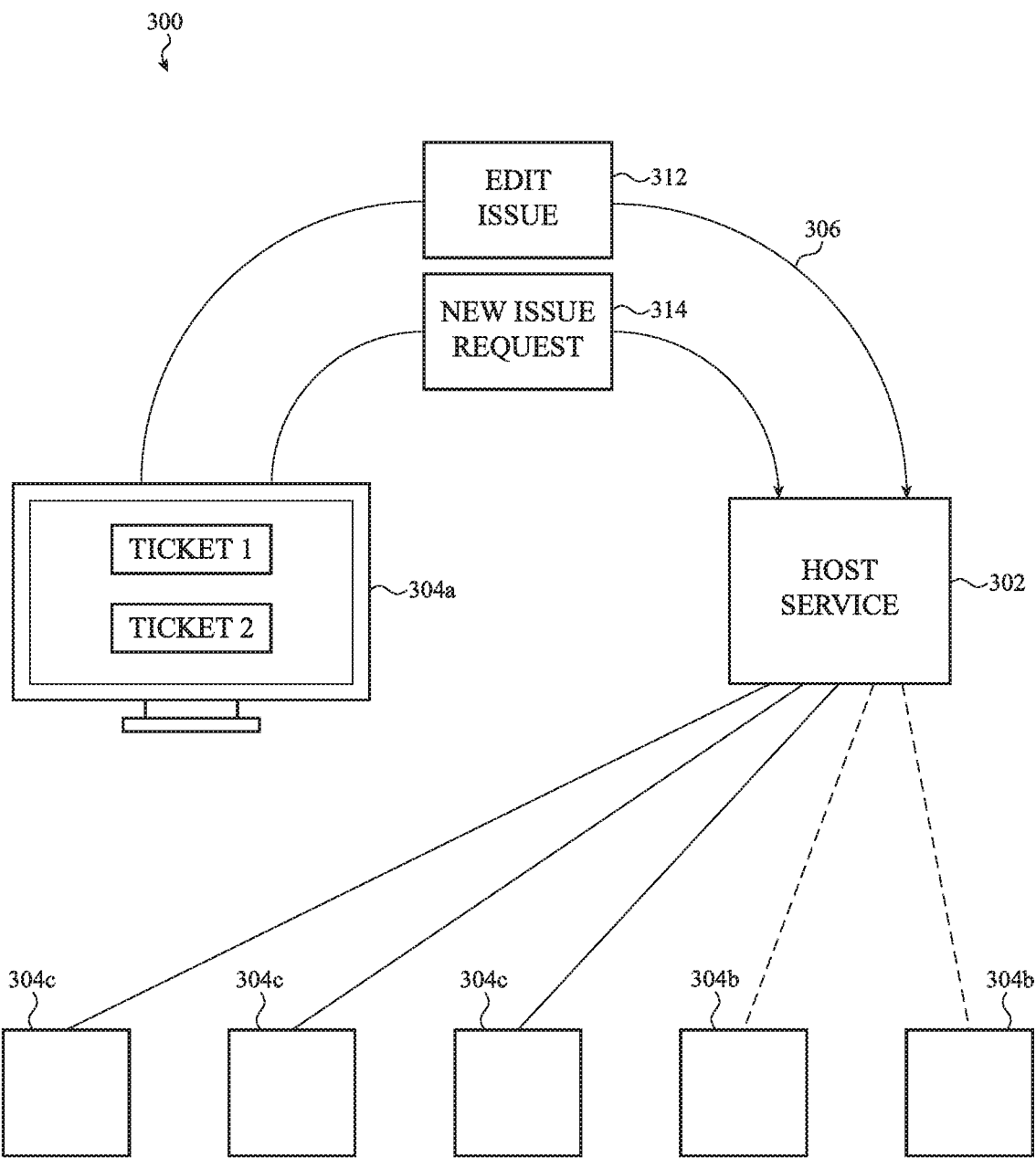
FIG. 3 is a signal flow diagram of an issue tracking system having notification suppression.

In accordance with some aspects of the system, an edit to an existing issue record or ticket, transmission of a new issue request or new ticket, request to close an issue record or ticket, and other interactions performed with the issue tracking system 200 during the live meeting may result in the generation of one or more notifications that may be transmitted to various client devices, in accordance with the embodiments described herein. FIG. 3, described below, provides an example schematic flow of various interactions between a client device and a host service of an issue tracking system.

In the example of FIG. 2, the issue tracking system 200 may be configured to identify or classify one or more of the client devices 204b, 204c, 204d as attending the live meeting or not attending the live meeting. In one example, the issue tracking system 200 is configured to determine a likelihood that one or more of the client devices 204b, 204c, 204d are attending the meeting using one or more of the techniques described herein. In accordance with a determination that a first subset of client devices (e.g., client devices 204b) has a likelihood that exceeds a threshold (e.g., an attendance threshold), the host service 202 of the issue tracking system 200 may suppress one or more notifications that are generated as a result of activity conducted during the meeting.

By way of example, the issue tracking system 200 may determine a likelihood of attendance for one or more of the client devices 204b, 204c, 204d. In the present example, the issue tracking system 200 is adapted to identify a first subset of client devices 204b as satisfying the attendance threshold and, accordingly, suppress one or more notifications that are generated during the course of a live meeting. The issue tracking system 200 may also be adapted to identify one or more other subsets of client devices 204c, 204d, that do not satisfy the attendance threshold. For these subsets of client devices, notifications may be generated in a normal fashion. However in some implementations, one set of client devices 204c that is located within geographic region 222 may receive notifications in a different fashion than another set of client devices 204d that is within a geographic region 224. In particular, the client devices 204c that are within the geographic region 222 may have some notifications that are suppressed during the live meeting, while still receiving some notifications. This allows for users to receive a certain level of notifications while they are on site and have the ability to attend the live meeting or may have attended only a portion of the live meeting.

The likelihood of attendance may be determined based on a variety of factors including an estimation of device proximity, a calendar entry, an e-mail response, an electronic tag or scanned input, express user input, and/or a variety of other factors. In one example, the issue tracking system 200 may be configured to estimate a proximity of one or more of the client devices 204b, 204c, 204d using a wireless signal or communication link. The wireless signal may include a wireless transmission or link that is implemented using Bluetooth, Ultra-Wide Band (UWB), Wi-Fi or other wireless communication protocol. The wireless signal may be transmitted from one or more of the client devices 204a, 204b, 204c, 204d and/or may be transmitted by a dedicated wireless transmitter like a router, network, or other device.

In one implementation, the wireless signal includes a beacon signal having a unique identifier that may correspond to the specific user device and/or the class or type of user device. The beacon signal may also include a transmission power reference that indicates a reference power level at which the wireless signal is being broadcast. The issue tracking system 200 may be configured to measure or estimate the received signal power of the wireless signal and, based at least in part on the reference power level, estimate a proximity of the respective client device that is transmitting the wireless signal. Based on the beacon signal, the issue tracking system 200 may be configured to determine a device ID (using the unique identifier) and associate an estimated proximity based on the strength of the wireless signal. As described in more detail below with respect to FIG. 7, a client device (e.g., the primary client device 204a) may include a proximity detection unit that is adapted to estimate a proximity of one or more other client devices using this technique.

In another implementation, the issue tracking system 200 may be configured to determine or estimate a proximity using a network communication device, such as a router or wireless hotspot. By way of example, the issue tracking system 200 may be configured to determine a likelihood that a first subset of client devices 204b is within a first geographic region 220 (e.g., a common room) based on an established wireless connection between the network communication device and each of the first subset of client devices 204b. The network connection may be a wireless communication link including, for example, an IEEE 802 transmission protocol or other wireless communication protocol. In some cases, a failure to establish a reliable wireless communication link is used to exclude user devices from the first set of user devices 204b. Similarly, additional network communication devices may be distributed throughout a building or facility and a proximity of the second subset of client devices 204c may be determined or estimated based on a connection to the one or more additional network communication devices that are located within the region 222 and/or outside of the first geographic region 220.

The likelihood of attendance may also be determined using a number of other factors (alone or in combination with an estimated proximity of the respective client devices). In one example, the likelihood of attendance is determined based on one or more calendar entries and/or responses to calendar invites that are associated with the various user devices. For example, the issue tracking system 200 may synchronize with one or more calendars of users associated with one or more respective client devices 204b, 204c, and 204d. The issue tracking system 200 may also extract or mine data from the one or more calendars. Synchronized or extracted data that indicates that the user has accepted the meeting invite may be used to increase the likelihood that the respective user will attend the live meeting. For example, receiving an explicit meeting acceptance or, in some cases, an absence of a declined meeting invite may be used to increase the likelihood of attendance. In some cases, conflicting meeting times and/or a history of not attending past meetings may be used to decrease the likelihood that the user will attend the live meeting. Other factors like a user's out of office calendar entry or e-mail auto-response may be used to reduce the likelihood that a user will attend the live meeting.

In some instances, the user may indicate a preference for receiving notifications during a live meeting by expressly "opting in" or electing to having his or her e-mail suppressed, which may be used to as a factor in determining the aforementioned likelihoods. In some cases, the user preferences may also be used to override an initial determination regarding the user's proximity or likelihood of attendance. By allowing a user to provide explicit input or indicate a preference, the issue tracking system 200 may be able to allow for circumstances that may not be efficiently addressed using one or more of the other implicit techniques (proximity estimation, calendar entry analysis, etc.) or to provide for a more robust option for users that are willing to provide explicit input or take additional actions. Thus, the likelihood of attendance may be a combination of implicit inferences automatically determined by the system and explicit input or preferences provided by the user.

The following examples are provided with respect to a user electing or agreeing to temporary notification suppression. However, the user may also opt out or indicate a preference to receive normal (unsuppressed) notifications, which may be used to alter the aforementioned likelihood or may override a previous determination regarding the user's proximity or likelihood of attendance. For example, a user may attend a first portion of a meeting, and due to the user's proximity to the primary user device 204a, the issue tracking system 200 may determine that the user has a sufficient likelihood of attendance to have notifications suppressed for at least the duration of the meeting. However, if the user needs to leave the meeting or only plans to attend a portion of the meeting, the user may indicate a preference to have notifications unsuppressed or a normal notification scheme restored using one or more of the techniques described below.

One example technique of obtaining a user preference may include the use of an e-mail, calendar communication, or other message to communicate the user's preference. For example, a calendar invite to the meeting may include an option to supply an e-mail message or other form of reply message that allows the user to indicate a preference to have notifications temporarily suppressed. The e-mail or reply message may include recognizable text (e.g., "mute messages and notifications") which, if included, may be interpreted by the issue tracking system 200 as the user's preference. The e-mail or reply message may also include a voting button, selection button, or other method of receiving user input that may be used to indicate the user's preference.

Similarly, any form of e-mail or message may be used to communicate a user's preference regarding notifications. The user may compose or transmit a pre-composed e-mail with text that indicates the user's preference to an admin account of the issue tracking system 200 and/or the meeting organizer or administrator. In some cases, the host services 202 may be adapted to extract and analyze text in the subject line or body of the e-mail or message that may be interpreted by the system 200 as a user preference regarding the suppression or un-suppression of notifications. For example, the host service 202 may be adapted to extract keywords, perform a text normalization operation (e.g., sentence segmentation, lemmatization, stop word removal, and so on), and/or perform one or more topic modeling operations on text that is extracted from an e-mail communication in order to determine a user preference.

In one example embodiment, a notification that is transmitted to the user may include an option to opt into a notification suppression scheme. For example, the host service 202 may be adapted to transmit a notification to a user that includes an option to reply or receive a user selection of a user's preference for muting or suppressing notifications. The notification may include a button or option to reply to a prompt. The prompt may indicate the appropriate user preference such as, "do you want to skip notifications for the next 30 minutes?" The prompt may also suggest context for the prompt such as, "it looks like you are in the weekly standup—do you want to mute or suppress notifications for the duration of the meeting?" User selection of the button or a reply may be used to control the notification scheme for the user and momentarily or temporarily suppress or mute the user's notifications.

Another example technique of obtaining a user preference may include the creation of a separate meeting that coincides with the occurrence of the live meeting. The separate meeting may include a special title such as "Mute Notifications, Ops Team Standup" indicating that acceptance of the meeting will result in a change in functionality of the issue tracking system 200 notification service. An acceptance of the separate meeting invite may be interpreted by the issue tracking system 200 as a user preference to suppress or mute notifications for the duration of the meeting (which may correspond to the planned duration of the live meeting).

Another example technique of obtaining a user preference may be to use a device that is adapted to identify the user and transmit a user preference to the host service 202 or other element of the issue tracking system 200. The device may also be used to log a user's attendance or register a user's location, which may be used by the issue tracking system 200 to control a notification scheme. In one implementation, the region 220 (e.g., a meeting room or meeting location) may be equipped with a wireless card reader that is configured to identify users (e.g., employees) using an access card or some other form of electronic identification. By registering with the wireless card reader, the user may indicate his or her attendance at the live meeting, which may be interpreted by the issue tracking system 200 as a user preference to suppress or mute notifications for the duration of the meeting. In some cases,. the user may use the wireless card reader to tag out when leaving, which may be interpreted by the issue tracking system 200 as a user preference to resume a normal or un-suppressed notification scheme.

A similar technique for detecting a user's preference or logging a user's attendance may be implemented using a variety of other hardware elements. In one implementation, a bar code, QR code, or other optical fiducial may be positioned within the region 222. Each user may use the camera or optical sensor on their respective user device to register their location or attendance at a live meeting. The client application running on the user's client device may extract a serial number from the optical fiducial and transmit the serial number and information identifying the user to the host service 202 of the issue tracking system 200, which may serve as a registration of the user's attendance. This registration may be interpreted by the issue tracking system 200 as a user preference to suppress or mute notifications for the duration of the live meeting. Similar to the card reader example provided above, the bar code, QR code, or other optical fiducial may be used when exiting, which may be interpreted as an indication to restore the user's original or normal notification scheme.

In some implementations, the issue tracking client application may include an express prompt or setting that may be manipulated by the user to indicate the user's preferences for receiving notifications. The prompt or setting may be tied to a calendar event or other scheduled activity so that the user's notifications are only temporarily suppressed for the estimated duration of the event or live meeting. In some cases, the prompt or setting is used to suppress or mute notifications for a fixed time, after which the issue tracking system 200 reverts the user's notification preferences to a normal or un-suppressed notification scheme.

The host service 202 or other element of the issue tracking system 200 may be adapted to estimate the duration of a meeting in order to temporarily suppress or mute notifications that are sent to a group or set of user devices. In one example, the host service 202 synchronizes calendars with one or more users in order to detect meetings for which notifications may be useful. In one example, the host service 202 is configured to extract text from a meeting title or meeting invite body that indicates that the meeting will relate to issues or tickets being tracked by the issue tracking system 200. For example, key text or topic modeling techniques may be used to determine that a calendar invite corresponds to a weekly standup or Kanban meeting, which are typically associated with the creation, modification, or deletion of issues or tickets being tracked by the issue tracking system 200. The issue tracking system 200 may be adapted to determine an estimated meeting duration, which may be based on the calendar entry and may add buffer time before and/or after the scheduled meeting to capture additional activity that may be associated with the meeting but does not occur strictly within the scheduled time of the live meeting.

In another example, the host service 202 may be adapted to monitor issue or ticket activity on the issue tracking system 200 and detect when a cluster or group of related tickets or issue records are being created, modified, or deleted within a particular time window. For example, if a series of issue records associated with a user are being manipulated in a relatively short window of time (e.g., less than 5 minutes, less than 15 minutes, less than 30 minutes, or other time window), the issue tracking system 200 may determine that a meeting is occurring or has begun. Similarly, the host service 202 may detect a cessation or lapse in activity on a group of tickets or issue records which may be used to determine that a meeting has ended or lapsed.

The issue tracking system 200 may implement the notification suppression in a number of ways. For example, while suppressing notifications, the issue tracking system 200 may transmit alerts to the various user devices for which notification suppression has been selected but may delay or cancel the transmission of e-mail notifications. In another example, the issue tracking system 200 may be adapted to delay all alerts, e-mails, messages, or other electronic communications for the duration of the temporary notification suppression. Furthermore, the issue tracking system 200 may be adapted to suppress notifications in a different fashion depending on the estimated proximity or location of the various groups or sets of user devices. With regard to the example of FIG. 2, the host service 202 may be adapted to suppress all electronic notifications (alerts, messages, and e-mails) for a first subset of user devices 204*a*, 204*b* that are located within region 220. The host service 202 may also be adapted to suppress some, but not all, electronic notifications for the second subset of client devices 204*c* that are located on site in region 222. The host service 202 may be adapted to transmit all normal notifications to a third subset of client devices 204*d* that is located in another region 224.

Figure 5:
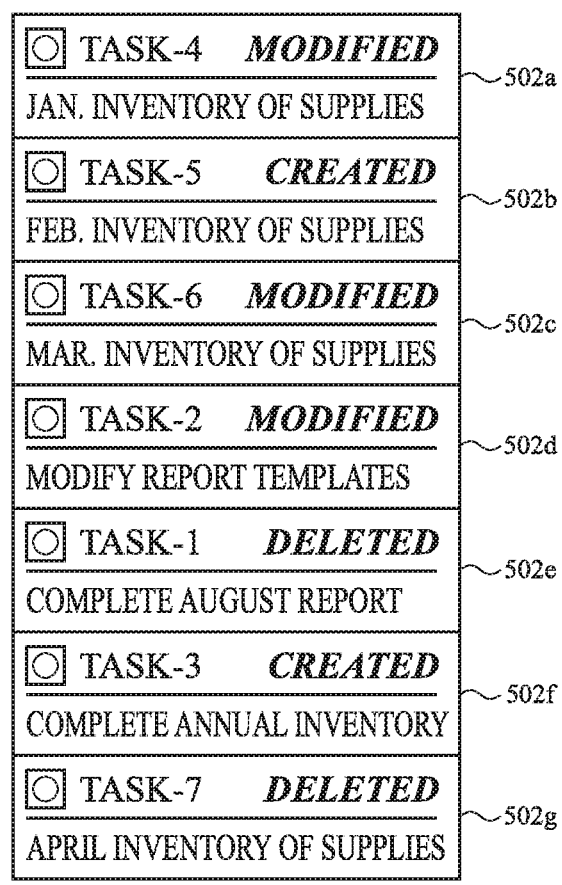
FIG. 5 depicts an example series of notifications received by a client device.

When the suppression period has lapsed (e.g., the meeting or event has lapsed), the issue tracking system 200 may be adapted to transmit a series of suppressed notifications. The series of notifications may or may not include all of the notifications that would have normally been transmitted if no suppression had occurred. For example, e-mail notifications that would have been transmitted if not suppressed (or that were transmitted to other client devices for which suppression was not implemented) may be canceled and not queued for delayed transmission. However, other electronic messages, which may be received or viewed through the issue tracking client application, may be delayed and then transmitted in a batch or series of notifications to the respective client device. An example set of notifications that is transmitted to a client device is depicted in FIG. 5, described below.

In some implementations, the issue tracking system 200 may be adapted to generate a log of notifications that occur during the estimated duration of the live meeting or other event. The log of notifications may correspond to all substantial activity or interactions with the issue tracking system 200 during the live meeting or event. In some cases, the issue tracking system 200 is adapted to generate a delta list or summary of changes that occurred during the live meeting or event. The delta list or summary of changes may or may not correspond to the notifications that are generated as a result of activity during the meeting. The issue tracking system 200 may transmit a log of notifications or a delta list or summary of changes to the respective client device in lieu of a series or group of notifications when the suppression period has lapsed.

FIG. 3 depicts an example process flow for an issue tracking system 300. The process flow of FIG. 3 may correspond to any or all of the issue tracking system examples described herein. Further, the actual process flow of any particular issue tracking system may include elements not included in the example of FIG. 3, which is a simplified illustration.

As shown in FIG. 3, a client device 304*a* may run or execute a client application that generates a graphical user interface. The graphical user interface may allow the user to manipulate a series of issues or tickets, as required during a live meeting or event. As shown in the simplified example of FIG. 3, the graphical user interface depicted on the client device 304*a* includes graphical elements that correspond to ticket 1 and ticket 2, which may be discussed and modified during the course of a live meeting or event. (Another example of a graphical user interface is provided in FIG. 4, discussed below.) In general, the graphical user interface may allow the user to perform one or more manipulations including, for example, issue creation, issue modification or editing, and issue deletion or closure. These example manipulations are provided by way of example and are not intended to be limiting.

In response to the user interactions with tickets displayed using the graphical user interface, the client device 304a may generate one or more action requests (or requests) to the host service 302. For example, a user may edit or modify an existing issue or ticket, which may result in an action request that is an edit issue request 312 that is transmitted to the host service 302 via network 306. Similarly, a user may request a new ticket or issue through the graphical user interface, which results in a transmission of another type of action request, a new issue request 314, to the host service 302 via network 306. Other manipulations or modifications to the tickets or issues may be performed, which are omitted from this example for the sake of clarity.

In response to receiving the various requests 312, 314 from the client device 304a, the host service 302 may perform one or more actions on issue records stored in and tracked by the issue tracking system 300. At least a portion of this activity may result in the generation of one or more notifications by the host service 302. The notifications may be transmitted to a set of client devices 304b, 304c in accordance with the embodiments described herein. In particular, the host service 302 may transmit notifications to one group of client devices while suppressing the transmission of notifications to another group of client devices. In one example, the host service 302 may identify a first group of client devices 304b for which notifications are suppressed (as indicated by the dashed lines in FIG. 3). The host service 302 may also identify a second group of client devices 304c for which the notification is transmitted or not suppressed (as indicated by the solid lines in FIG. 3).

The determination of which group of client devices receive notifications and which group of client devices have notifications suppressed may be made in accordance with any of the examples provided herein. In particular, the host service 302 may determine a likelihood that the users associated with one or more of the client devices are attending a live meeting. The host service 302 may also determine a likelihood that one or more of the client devices are proximate to the (primary) client device 304a. Based on the respective likelihood exceeding a threshold or satisfying a criteria, the host service 302 may suppress notifications to a first group of client devices 304b while transmitting notifications to a second group of client devices 304c.

In some cases, the type of activity or action request that is performed affects whether the corresponding notification is suppressed. For example, activity that results in an action request for generating a new issue (e.g., new issue request 314) may result in a notification that is not suppressed for the first group of client devices 304b. However, activity that results in another type of action request (e.g., an edit action request 312) may result in a notification that is suppressed for the first group of client devices 304b. Accordingly, while the transmission of notifications may be suppressed for the first group of client devices 304b, the first group of client devices 304b may still receive some notifications. This is provided by way of example, and other filtering or suppression schemes may be used that suppress or do not suppress certain notifications based on the type of activity that caused the generation of the respective notifications.

Figure 4:
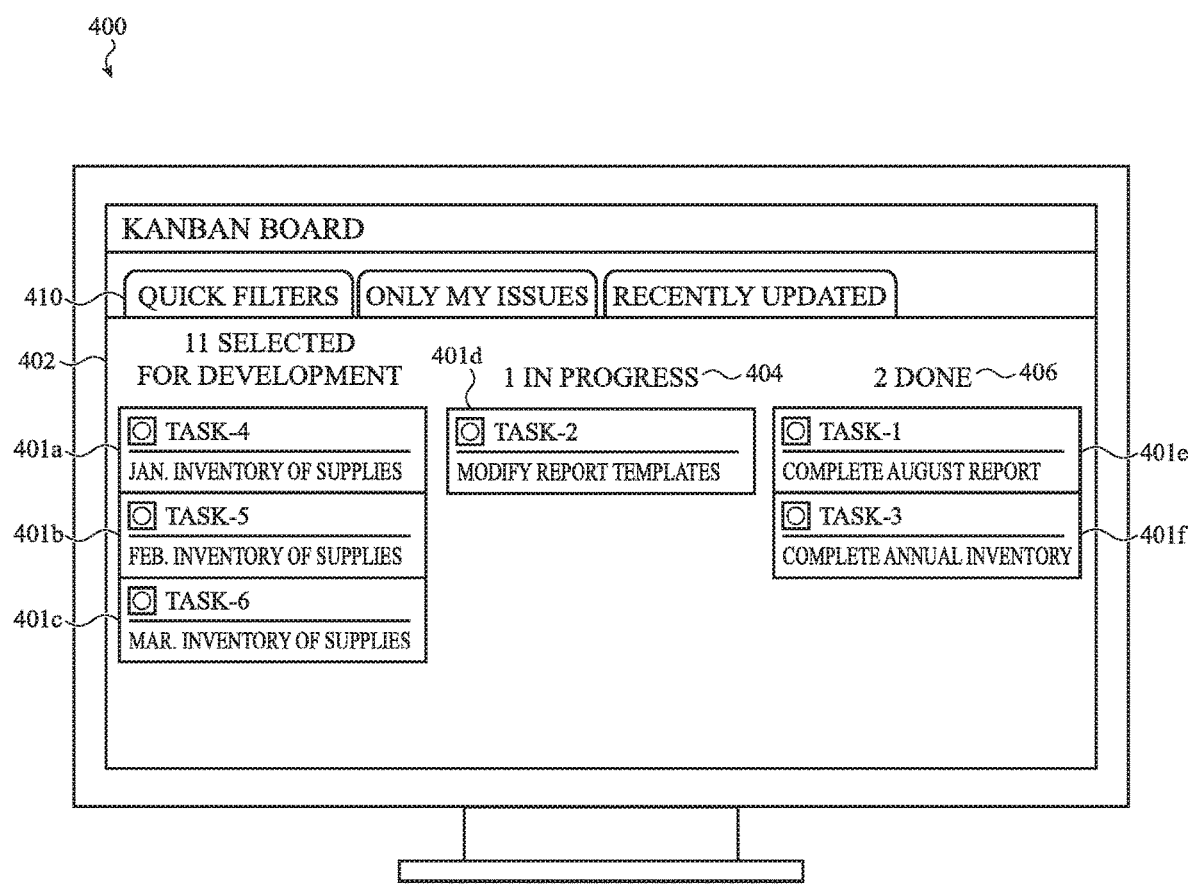
FIG. 4 depicts an example graphical user interface of an issue tracking client application.

FIG. 4 depicts an example graphical user interface 400 that may be displayed on a client device. The graphical user interface 400 may be generated by an issue tracking client application, which may include graphical objects remotely generated and viewed through a web browser and/or may include graphical objects that are generated locally on the client device by a dedicated issue tracking client application.

The current example depicted in FIG. 4 corresponds to a Kanban Board that may be displayed as part of a weekly or regularly occurring standup meeting. As shown in FIG. 4, the interface may include graphical elements that correspond to one or more tickets or issues that are being tracked by an issue tracking system. In this example, the graphical elements are labeled as tasks 401a, 401b, 401c, 401d, 401e, 401f. With regard to this example, the terms "tasks," "issues," and "tickets" may be used to refer to the same issue record or item that is being tracked by the issue tracking system. That is, each of the various tasks 401a, 401b, 401c, 401d, 401e, 401f may correspond to one or more issue records that are tracked by the issue tracking system.

As shown in FIG. 4, the various tasks 401a, 401b, 401c, 401d, 401e, 401f may be grouped by status. A first set of tasks 401a, 401b, 401c is identified as having a first status 402 ("Selected for Development"). A second set of tasks 401d is identified as having a second status 404 ("In Progress"). A third set of tasks 401e, 401f is identified as having a third status 406 ("Done"). The tasks may also be organized or filtered in accordance with one or more tabs 410 that allow easy navigation between different groups of tasks. The depicted grouping is provided by way of example and is not intended to be limiting in nature.

The user may manipulate the various tasks (corresponding to issues or tickets) in a variety of ways. In one example, the user may drag and drop (or otherwise move) the various issues between the groups to indicate a change in status of the respective item. Changing the status of one or more items may result in an issue modification request being transmitted to a host service, which may edit or otherwise modify an existing issue record. The various tasks may also be manipulated by selecting a respective task, which may open or enlarge the respective task in a window and present the user with a series of user-editable fields and/or user-selectable options. User interaction with a particular field or selectable option in the displayed task may also result in an issue modification request being transmitted to a host service, which may edit or otherwise modify an existing issue record. Example modifications include, without limitation, changing task status, changing or adding a task assignee, adding a comment or note, adding a linked task or issue, and so on.

The various modifications that are performed using the graphical user interface may result in the edit or modification of an existing issue record, the creation of a new issue record, and/or the deletion or closure of an existing issue record. At least some of these modifications, which may be performed or implemented by the host service, result in the generation of a notification. In accordance with the examples provided herein, the notifications may either be transmitted immediately to one group of client devices while transmission is suppressed or muted for another group of client devices.

FIG. 5 depicts an example graphical user interface 500 that includes a series or group of notifications 502a-g that have been received by a client device. The notifications 502a-g may have been generated and transmitted in response to manipulations of one or more tasks or issues associated with a graphical user interface similar to the one depicted in FIG. 4. As shown in FIG. 5, each notification may indicate the title of the task (e.g., "TASK-4") a description of the task (e.g., "JAN INVENTORY OF SUPPLIES") and an indicia of the action performed (e.g., "MODIFIED"). The information included in the notifications 502a-g of FIG. 5 is provided by way of example and is not intended to be limiting in nature.

The notifications 502a-g may be displayed using an issue tracking client application, which may receive and store the notifications as private messages or simply messages. In addition to the notifications 502a-g depicted in FIG. 5, a series of e-mails or e-mail messages may also be transmitted to the client device, which may be handled by an e-mail program or client application, such as Outlook or MacOS Mail, Hotmail, Gmail, and the like. For purposes of the embodiments described herein, the term notification may be used to refer to private messages, e-mail messages, and other forms of electronic communication or messaging.

In accordance with the examples described herein, the notifications 502a-g may be transmitted in a normal or un-suppressed fashion to one group of client devices while being suppressed (e.g., delayed, grouped, batched, or canceled) for another group of client devices. Furthermore, in accordance with the examples described herein, a log, summary, or delta list may be transmitted to the client device in lieu of individual (suppressed) notifications, depending on the implementation.

Figure 6:
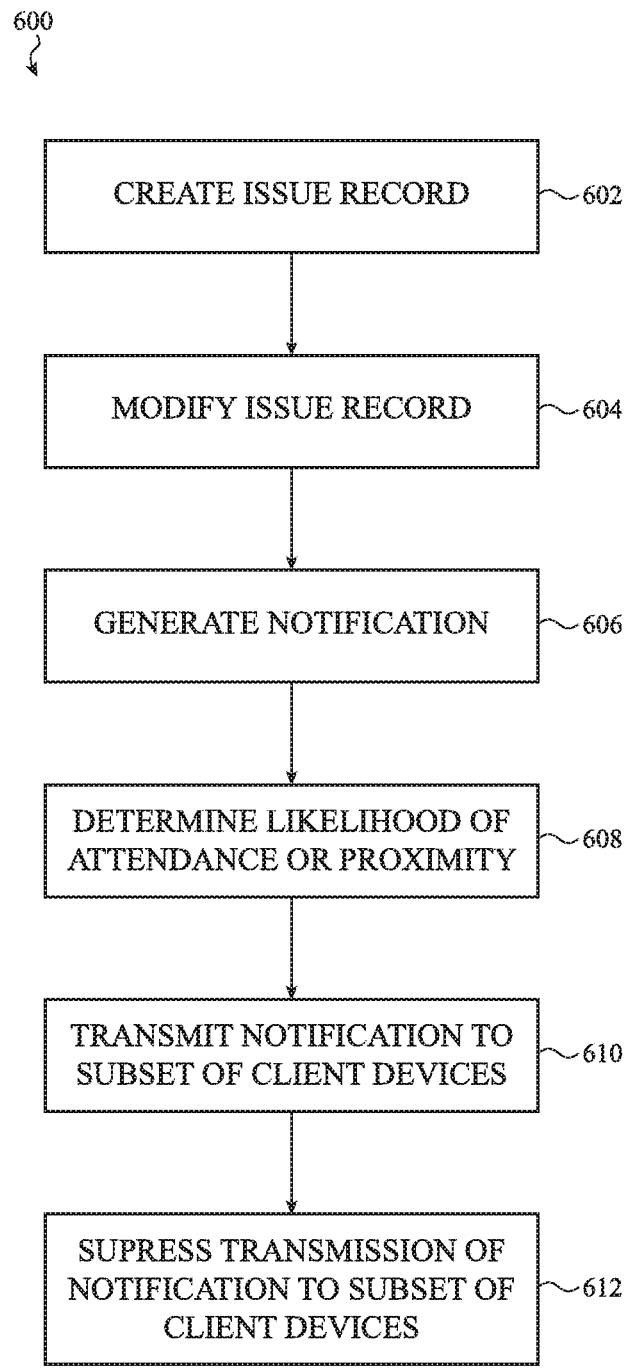
FIG. 6 is a flow chart that depicts example operations of a method of suppressing notifications in an issue tracking system.

FIG. 6 depicts an example process 600 for generating and transmitting notifications associated with a live meeting using an issue tracking system. The process 600 may be implemented using one or more of the issue tracking systems described herein. In accordance with some embodiments, one or more operations of the process 600 may be omitted. Likewise, the process 600 may not be inclusive of all operations or steps, depending on the implementation. Furthermore, it is not necessary that all of the operations described below be performed during a live meeting or even in association with a live meeting.

In operation 602, an issue record is generated. In accordance with the examples provided herein, an issue record may be generated by a client device (e.g., a primary client device) using a graphical user interface produced by a client application. The issue record may be generated by a host service in response to a new issue request transmitted from the client device. The issue record may be generated in response to user activity during a live meeting. However, it is not necessary that the issue record be generated in accordance with a live meeting or during a live meeting.

In operation 604, an issue record is modified. In accordance with the examples provided herein, an issue record may be modified by a client device (e.g., a primary client device) using a graphical user interface produced by a client application. The issue record may be modified or edited by a host service in response to an issue edit request transmitted from the client device. The issue record may be modified or edited in response to user activity during a live meeting. However, it is not necessary that the issue record be modified in accordance with a live meeting or during a live meeting.

Operations 602 and 604 may be optional or may not both be performed in the same implementation. For example, in some implementations, an issue record is generated in accordance with operation 602 but an issue record is not modified in accordance with operation 604. Likewise, an issue record may be modified in accordance with operation 604 but an issue record may not be created in accordance with operation 602. Furthermore, other issue manipulations may be performed in lieu of operations 602 or 604 including, without limitation, issue deletion, issue closure, and issue completion.

In operation 606, a notification is generated. In accordance with the embodiments described herein, a host service may generate one or more notifications in response to a manipulation of an issue record. Example manipulations of an issue record include the creation of a new issue record in accordance with operation 602, the modification of an issue record in accordance with operation 604, an issue record deletion, and/or an issue record closure or completion.

In operation 608, a likelihood of attendance or proximity is determined with respect to one or more client devices. In accordance with the embodiments described herein, a host service may determine a likelihood that a user associated with a client device is attending a live meeting. As described above with respect to FIG. 2 and other embodiments herein, the likelihood may be based on one or more factors including, without limitation, an estimated proximity of a respective client device, one or more calendar entries, an electronic message or communication received from the user, input received from a card reader, optical scanner, camera, or other device, and express user input. The host service may also determine the likelihood that a respective client device is proximate to a primary client device that may be facilitating or running the live meeting. As described above with respect to FIG. 2 and other embodiments herein, the likelihood of proximity may be determined using a wireless signal or wireless transmission, such as a beacon signal or wireless network connection.

By way of example, each client device may have a standard or default likelihood of attendance. The likelihood that may correlate to a statistical probability that the user associated with the respective client device will attend a given live meeting. The standard or default likelihood may be adjusted up or down based on any number of factors described herein. For example, a proximity of the client device with respect to the primary client device or with respect to a known wireless device (e.g., a wireless router or wireless beacon) may increase the likelihood of attendance. Similarly, an acceptance of a calendar entry and/or an e-mail from the user regarding the live meeting may also increase the likelihood of attendance. Furthermore, input received from a card reader, optical scanner, or other device may also increase the likelihood of attendance. Conversely, the absence of any one or more of the elements or factors described herein (e.g., lack of a device proximity, non-acceptance of a meeting, no input from a card reader or device) may result in the likelihood being reduced. In some implementations, each element or factor is weighted and a combined or aggregated likelihood is computed using the weighted factors.

In operation 610, a notification is transmitted to a subset of client devices. More specifically, in accordance with embodiments described herein, the host service may identify a subset of client devices that do not satisfy the attendance and/or proximity threshold. In accordance with this determination, normal (un-suppressed) notification transmission may be conducted with this subset of client devices. Operation 610 may be an option and may not be performed, depending on the implementation of process 600. The attendance and/or proximity threshold may be dynamically adjusted based on, for example, feedback from one or more users confirming actual attendance. The attendance and/or proximity threshold may also be dynamically adjusted based on location, meeting size, and specific users that are in attendance. In some cases, each user has a custom attendance and/or proximity threshold that may be dynamically adjusted over time.

In operation 612, a transmission of a notification is suppressed to a subset of client devices. More specifically, in accordance with embodiments described herein, the host service may identify a subset of client devices that satisfies, meets, or exceeds the attendance and/or proximity threshold. In accordance with this determination, a notification transmission may be suppressed for this subset of client devices. As described above with respect to various embodiments, suppression of a notification may include a delay of notification transmission, cancelation of a notification transmission, delayed grouping of a notification transmission, transmission of a delta list or summary in lieu of a notification, and other altered notification transmission schemes.

Figure 7:
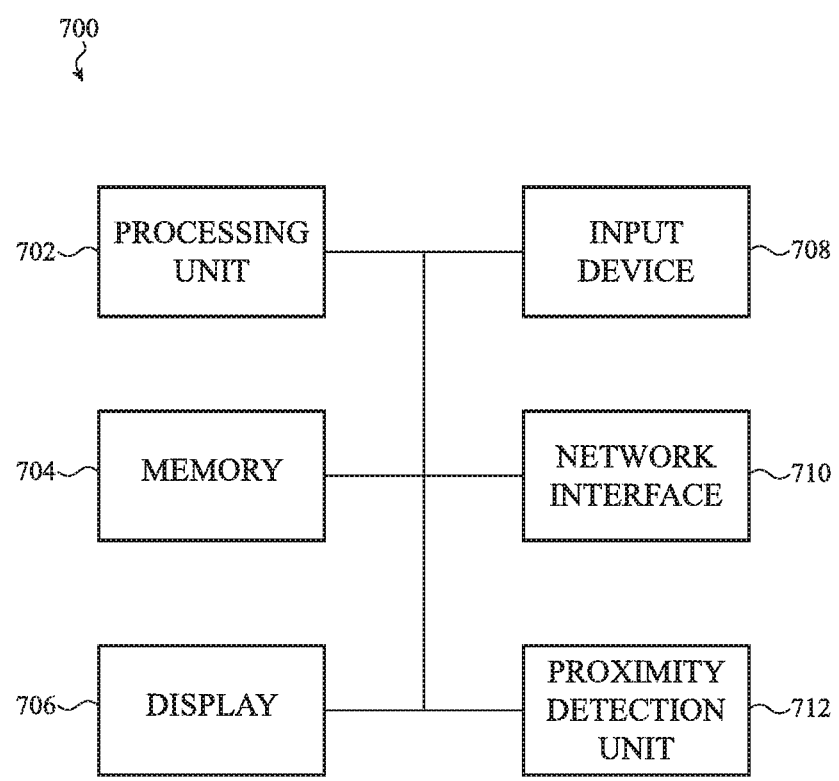
FIG. 7 depicts an example hardware configuration of a client device.

FIG. 7 depicts an example schematic diagram of a device 700. By way of example, the device 700 of FIG. 7 may correspond to the client devices 104*a-c*, 204*a-d*, 304*a-c* described above with respect to FIGS. 1-3 (or any other client devices described herein). Aspects of the device 700 may also correspond to elements of the host service, issue tracking server, notification service, and other elements of the issue tracking system described herein. To the extent that multiple functionalities, operations, and structures are disclosed as being part of, incorporated into, or performed by the device 700, it should be understood that various embodiments may omit any or all such described functionalities, operations, and structures. Thus, different embodiments of the device 700 may have some, none, or all of the various capabilities, apparatuses, physical features, modes, and operating parameters discussed herein.

As shown in FIG. 7, a device 700 includes a processing unit 702 operatively connected to computer memory 704. The processing unit 702 may be operatively connected to the memory 704 components via an electronic bus or bridge. The processing unit 702 may include one or more computer processors or microcontrollers that are configured to perform operations in response to computer-readable instructions. The processing unit 702 may include the central processing unit (CPU) of the device. Additionally or alternatively, the processing unit 702 may include other processors within the device, including application specific integrated chips (ASIC) and other microcontroller devices.

The memory 704 may include a variety of types of non-transitory computer-readable storage media, including, for example, read access memory (RAM), read-only memory (ROM), erasable programmable memory (e.g., EPROM and EEPROM), or flash memory. The memory 704 is configured to store computer-readable instructions, sensor values, and other persistent software elements. The memory 704 may also include a variety of types of non-transitory computer-readable storage media including, for example, a hard-drive storage device, a solid-state storage device, a portable magnetic storage device, or other similar device. The memory 704 may also be configured to store computer-readable instructions, sensor values, and other persistent software elements.

In this example, the processing unit 702 is operable to read computer-readable instructions stored on the memory 704. The computer-readable instructions may be provided as a computer-program product, software application, client application, issue tracking client application, and so on.

As shown in FIG. 7, the device 700 also includes a display 706. The display 706 may include a liquid-crystal display (LCD), organic light emitting diode (OLED) display, light emitting diode (LED) display, or the like. If the display 706 is an LCD, the display 706 may also include a backlight component that can be controlled to provide variable levels of display brightness. If the display 706 is an OLED or LED type display, the brightness of the display 706 may be controlled by modifying the electrical signals that are provided to display elements. The display 706 may correspond to any of the displays shown or described herein, such as the display 101 (FIG. 1) that is used to display a graphical user interface in accordance with the embodiments described herein.

In some embodiments, the device 700 includes one or more input devices 708. An input device 708 is a device that is configured to receive user input. The one or more input devices 708 may include, for example, a rotatable input system, a push button, a touch-activated button, a keyboard, a key pad, or the like (including any combination of these or other components). In some embodiments, the input device 708 may provide a dedicated or primary function, including, for example, a power button, volume buttons, home buttons, scroll wheels, and camera buttons.

The device 700 may also include a network interface 710 that is configured to transmit and/or receive signals or electrical communication from an external or separate device. The network interface 710 may be configured to couple to an external device via a cable, adaptor, or other type of electrical connector. In some embodiments, the network interface 710 may be used to couple the device 700 to an accessory, including a dock or case, a stylus or other input device, smart cover, smart stand, keyboard, or other device configured to send and/or receive electrical signals.

The device 700 may also include a proximity detection unit 712. The proximity detection unit 712 may include one or more wireless transceivers that are configured to detect and analyze wireless signals received by the device 700. In accordance with the examples described herein, the proximity detection unit 712 may be configured to detect a wireless beacon signal that includes a unique identifier and a transmission power reference or reference power signal. The proximity detection unit 712 may also be adapted to estimate or measure a received signal power level for a wireless (beacon) signal and estimate a proximity of the device 700 with respect to a source of the wireless (beacon) signal based on the received signal power level and the transmission power reference or reference power signal. The proximity detection unit 712 may also be adapted to detect or determine a proximity based on an ability to establish a wireless communication link such as a WiFi or Bluetooth communication link with a separate device.

While the device 700 is described as having a particular set of components, the device 700 is not limited to only those components described herein. For example, a device may include more than one of the components described with respect to FIG. 7 or elsewhere in the instant application, and may indeed include other components not described herein.

It is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Accordingly, one may appreciate that, although many embodiments are disclosed above, the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

I claim:

1. An issue tracking system for editing and tracking issue records, the issue tracking system comprising:
    a primary client device configured to display a graphical user interface of a primary issue tracking client application that is configured to generate new issue requests and edit existing issue records during a live meeting;
    a set of secondary client devices, each secondary client device of the set of secondary client devices configured to display a graphical user interface of a secondary issue tracking client application; and
    a host service that is operably coupled to the primary client device and the set of secondary client devices over a network, the host service configured to:
        generate a new issue record in response to receiving a new issue request from the primary client device;
        modify an existing issue record in response to receiving an edit request from the primary client device;
        generate a notification for one or more of a creation of the new issue record or the modification of the existing issue record;
        determine a likelihood that one or more secondary client devices of the set of secondary client devices are associated with one or more users attending the live meeting;
        identify a first subset of client devices of the set of secondary client devices for which the likelihood exceeds an attendance threshold;
        identify a second subset of client devices of the set of secondary client devices for which the likelihood does not exceed the attendance threshold;
        transmit the notification to the second subset of client devices; and
        suppress a transmission of the notification to the first subset of client devices.

2. The issue tracking system of claim 1, wherein:
    the host service is configured to estimate a duration of the live meeting;
    the transmission of the notification is suppressed for the first subset of client devices for a first duration; and
    the first duration is determined based, at least in part, on the estimated duration of the live meeting.

3. The issue tracking system of claim 2, wherein:
    the host service is configured to generate a first notification in response to the new issue record being created;
    the host service is configured to transmit the first notification to the first subset of client devices after the first duration has lapsed;
    the host service is configured to generate a second notification in response to the modification of the existing issue record; and
    the host service is configured to transmit the second notification to the second subset of client devices and the second notification is not transmitted to the first subset of client devices.

4. The issue tracking system of claim 1, wherein:
    determining the likelihood that one or more secondary client devices are associated with one or more users attending the live meeting comprises:
        establishing a wireless communication link between the primary client device and a respective secondary client device of the one or more secondary client devices; and
        estimating a proximity between the respective secondary client device and the primary client device based, at least in part, on the wireless communication link.

5. The issue tracking system of claim 4, wherein:
    the estimated proximity includes a determination that the respective secondary client device and the primary client device are in a common room.

6. The issue tracking system of claim 1, wherein:
    determining the likelihood that one or more secondary client devices are associated with one or more users attending the live meeting comprises receiving an acceptance of a calendar invite from a respective secondary client device of the one or more secondary client devices.

7. The issue tracking system of claim 1, wherein:
    determining the likelihood that one or more secondary client devices are associated with one or more users attending the live meeting comprises receiving an e-mail reply from a secondary client device of the one or more secondary client devices; and
    determining the likelihood is based, at least in part, on subject text extracted from the e-mail reply.

8. The issue tracking system of claim 1, wherein:
    the host service is configured to reassign a respective secondary client device from the second subset of client devices to the first subset of client devices in response to a user input to the secondary issue tracking client application on the respective secondary client device.

9. The issue tracking system of claim 1, wherein:
    the first and second subsets of client devices are associated with respective users that are named in the new issue request or that are named in the existing issue record; and
    the host service is configured to not transmit the notification to users that are not named in either the new issue request or the existing issue record.

10. The issue tracking system of claim 1, wherein:
    the host service is configured to determine an estimated duration of the live meeting;
    the host service is configured to suppress a transmission of a series of notifications that are generated before the estimated duration has lapsed; and
    the host service is configured to transmit the series of notifications to the first subset of client devices after the estimated duration has lapsed.

11. An issue tracking system for updating a set of issue records of a project during a live meeting, the issue tracking system comprising:
    a primary user device displaying a graphical user interface during the live meeting;
    a set of user devices, each user device associated with a user named in one or more issue records of the set of issue records; and a host service operably coupled to the primary user device and the set of user devices by a network, the host service configured to:
   receive an action request from the primary user device, the action request associated with one or more records of the set of issue records;
   modify or create an issue record in response to receiving the action request;
   generate a notification corresponding to the action request;
   determine a likelihood that a first subset of user devices of the set of user devices is proximate to the primary user device when the action request was generated by the primary user device;
   suppress a transmission of the notification to the first subset of user devices; and
   transmit the notification to a second subset of user devices of the set of user devices.

12. The issue tracking system of claim 11, wherein:
the issue tracking system is configured to determine a proximity estimate for one or more user devices of the set of user devices; and
the likelihood is determined based, at least in part, on the proximity estimate satisfying a proximity threshold.

13. The issue tracking system of claim 12, wherein:
the issue tracking system is configured to determine the proximity estimate using a wireless signal received by the primary user device from the one or more user devices.

14. The issue tracking system of claim 13, wherein:
the wireless signal is a wireless beacon signal that includes a unique identifier and a transmission power reference; and
the likelihood is determined based, at least in part, on the transmission power reference and a received signal power of the wireless signal.

15. The issue tracking system of claim 11, wherein:
the likelihood is determined based, at least in part, on an acceptance of a meeting request from a respective user device of the set of user devices.

16. The issue tracking system of claim 11, wherein:
the set of user devices is each configured to execute an issue tracking client application that is configured to display received message notifications;
the host service is configured to transmit an e-mail notification and a message notification to the second subset of user devices in response to the generation of the notification;
the host service is configured to transmit the message notification to the first subset of user devices in response to the generation of the notification and a determination that the live meeting has lapsed; and
the host service does not transmit the e-mail notification to the first subset of user devices.

17. A computer-implemented method for updating a set of issue records of a project during a live meeting, the method comprising:
   displaying a graphical user interface using a primary user device during the live meeting;
   receiving an action request from the primary user device during the live meeting, the action request associated with one or more records of the set of issue records;
   modifying or creating an issue record in response to receiving the action request;
   generating a notification corresponding to the action request;
   determining a likelihood that one or more client devices of the set of client devices are associated with one or more users attending the live meeting;
   identifying a subset of client devices of the set of client devices for which the likelihood exceeds an attendance threshold; and
   suppressing a transmission of the notification to the subset of client devices at least until a determination that a duration of the live meeting has lapsed.

18. The computer-implemented method of claim 17, wherein determining the likelihood that the one or more client devices of the set of client devices are associated with the one or more users attending the live meeting comprises:
   receiving a wireless transmission from the one or more client devices; and
   estimating a proximity of the one or more client devices based on a received power of the wireless transmission.

19. The computer-implemented method of claim 18, wherein determining the likelihood that the one or more client devices of the set of client devices are associated with the one or more users attending the live meeting comprises:
   receiving a response to a calendar invite from the one or more client devices.

20. The computer-implemented method of claim 18, wherein:
   the notification is one of a group of notifications that are generated during the live meeting; and
   the group of notifications are transmitted to the subset of client devices after the live meeting has lapsed.

* * * * *